(12) United States Patent
Ressel (10) Patent No.: US 12,446,640 B2
(45) Date of Patent: Oct. 21, 2025

(54) METHOD OF PRODUCING AND MANUFACTURING GLOVES, AND OTHER PERSONAL PROTECTIVE EQUIPMENT (PPE), USING MULTI-PLY FLEXIBLE FILMS

(71) Applicant: Dorothy Ressel Intellectual Properties, Inc., Apache Junction, AZ (US)

(72) Inventor: Dorota Ressel, Apache Junction, AZ (US)

(73) Assignee: Dorothy Ressel Intellectual Properties, Inc., Apache Junction, AZ (US)

( * ) Notice: Subject to any disclaimer, the term of this patent is extended or adjusted under 35 U.S.C. 154(b) by 243 days.

(21) Appl. No.: 17/663,379

(22) Filed: May 13, 2022

(65) Prior Publication Data

US 2023/0301381 A1    Sep. 28, 2023

(30) Foreign Application Priority Data

Mar. 28, 2022    (PL) .......................................... 440774

(51) Int. Cl.
| | | |
|---|---|---|
| A41D 19/02 | (2006.01) | |
| A41D 19/00 | (2006.01) | |
| B32B 7/05 | (2019.01) | |
| B32B 27/08 | (2006.01) | |
| B32B 37/00 | (2006.01) | |
| B32B 38/00 | (2006.01) | |

(52) U.S. Cl.
CPC ......... *A41D 19/02* (2013.01); *A41D 19/0068* (2013.01); *B32B 7/05* (2019.01); *B32B 27/08* (2013.01); *B32B 37/0076* (2013.01); *B32B 2038/0028* (2013.01); *B32B 2250/02* (2013.01); *B32B 2250/24* (2013.01); *B32B 2307/732* (2013.01); *B32B 2437/02* (2013.01); *B32B 2571/00* (2013.01)

(58) Field of Classification Search
CPC ...... A41D 19/02; A41D 19/0068; B32B 7/05; B32B 27/08; B32B 37/0076; B32B 2038/0028; B32B 2250/02; B32B 2250/24; B32B 2307/732; B32B 2437/02; B32B 2571/00; B32B 27/32; B32B 27/40; B32B 2262/02; B32B 2307/7376; B32B 3/28; B32B 27/18; B32B 27/302; B32B 27/304; B29C 65/08
See application file for complete search history.

(56) References Cited

U.S. PATENT DOCUMENTS

| | | | |
|---|---|---|---|
| 2008/0103460 A1* | 5/2008 | Close | A61L 9/042 604/293 |
| 2008/0138638 A1* | 6/2008 | Withers | B29C 59/022 428/480 |

(Continued)

*Primary Examiner* — S. Behrooz Ghorishi
(74) *Attorney, Agent, or Firm* — IPTechLaw (57) ABSTRACT

A method of producing multi-ply foil sheets intended for the manufacturing of protective covers for body parts, in particular gloves or packaging, comprising of at least two individual plies of film (12) stacked on top of each other and interconnected by means of week and non-continuous bonding, achieved by thermal embossing or ultrasonic welding. The invention also relates to personal protective equipment (PPE) or packaging made of the same multi-ply films.

20 Claims, 8 Drawing Sheets

(56) References Cited

U.S. PATENT DOCUMENTS

| | | | |
|---|---|---|---|
| 2013/0104286 A1* | 5/2013 | Shawver | B29C 66/8242 |
| | | | 2/168 |
| 2019/0183193 A1* | 6/2019 | Sorrels | B29C 66/73921 |
| 2019/0283390 A1* | 9/2019 | Poulain | G06T 7/0004 |
| 2021/0102100 A1* | 4/2021 | Xia | B32B 27/30 |

* cited by examiner

METHOD OF PRODUCING AND MANUFACTURING GLOVES, AND OTHER PERSONAL PROTECTIVE EQUIPMENT (PPE), USING MULTI-PLY FLEXIBLE FILMS

BACKGROUND

1. Technical Field

The subject of the invention is the method of using multi-ply film sheets to produce and manufacture protective covers for body parts (PPE), in particular protective gloves, and their packaging.

2. Background

Protective gloves are used by many people working in many industries. Many of the protective gloves currently used are rubber gloves. Rubber gloves are subject to excessive water absorption. Water during hydration can bind to chemicals being washed off from the surface at the ionic or cationic level and create chemically harmful side solutions. In addition, carcinogenic free radicals such as hydroxyl ions OH-ion (one negative hydroxide) may be released during rubber hydration. Water (including human sweat) can bind to various types of chemical additives, and chemical accelerators, which can be on the surface of synthetic rubber gloves, such as nitrile gloves. Chemicals can gradually permeate with water through the rubber glove into the user's skin and vice versa where the user's sweat, together with other biological substances can penetrate to the outside of the glove during prolonged use. Contaminants dissolved in water can penetrate into the wearer's skin, and also permeate to the outside of the glove, and can become a source of pathogenic contamination to food, glove users, and people touched by gloves.

To help reduce this problem, gloves made of ultra-thin films have much greater resistance to hydration, compared to nitrile gloves.

Known ways to make gloves out of foil are to cut the shape of the gloves from the foil sheets and then bond them, leaving the edge unattached at the wrist in order to allow the glove to be put on the hand. Foil gloves are usually not very durable and do not offer comfort of wearing.

Patent application US2012054943A1 is known as a method of manufacturing a disposable glove involving the following stages: extrusion of at least two layers of flat film from a thermoplastic elastomer with a thickness of 0.02 mm to 0.06 mm; placing the said flat thermoplastic elastomeric films on top of each other on a flat surface; providing a heated glove-shaped stencil knife to cut the aforementioned flat thermoplastic elastomeric films on top; exerting pressure on the aforementioned heated stencil knife, which results in the simultaneous cutting of the shape of the hand from the aforementioned flat films from the thermoplastic elastomer, thus producing a glove containing part of each of the said flat thermoplastic elastomer films; and welding together part of the edging of each of the mentioned flat thermoplastic elastomeric film of the aforementioned glove shape in order to produce a glove thickness between 0.02 mm and 0.6 mm and a deformation between 10% and 30% after 100% stretching.

Patent application US2008103460A1 is known for the method of manufacturing gloves adapted to transfer the composition from the surface of the glove to the skin of the glove wearer, which includes delivery of the formulation, delivery of a film containing a flexible layer and a protective layer, where the protective layer is impermeable to the formulation; the first fiber mesh; the supply of a second fiber mesh; stretching the film, covering the stretched film with nets on both sides and sliding between the rolls, and then combining them and applying the formulation to the fiber mesh after the impermeable side of the layer.

In order to improve the properties of gloves, traditional films are being replaced, for example, with polyethylene fiber material. This solution is known from the patent description EP2582258B1.

From the patent description EP2773281B1, elastomeric products are known, such as gloves made by welding two flat layers of multi-layer film. The film layers are welded together by ultrasonic bonding, thermal bonding, or both. A multilayer film contains at least three layers that are co-extruded in one embossing. Each layer of multilayer film has a different composition, which gives layers with different properties.

Implementations of methods of manufacturing personal protective equipment (PPE) may include stacking at least two individual plies of film and interconnecting the at least two individual plies of film. The interconnecting may include interconnecting through weak and non-continuous bonding through either thermal embossing or ultrasonic welding.

Implementations of the method may include one, all, or any of the following:

The at least two individual plies of film may be stretched alternately either longitudinally or transversely.

The method may include corrugating alternately either longitudinally or transversely before stacking the at least two individual plies of film.

The at least two individual plies of film may form a mesh pattern when interconnected.

The at least two individual plies of film may include either high-density polyethylene (HDPE), low-density polyethylene (LDPE), film based on thermoplastic polymers made of ethylene monomer, polystyrene, polyurethane, polybutene, styrene-butadiene copolymers, ethylene-propylene copolymers (EPC), styrene-ethylene-butylene-styrene (SEBS), styrene-isoprene-styrene (SIS), polyvinyl chloride films, or films enriched with thermoplastic fibers.

A bond between the at least two plies of film after interconnection may be weaker than any ply of the at least two plies of film.

Each ply of the at least two plies of film may include a thickness either equal to or less than 0.1 mm.

Implementations of the method may include inspecting each ply of the at least two plies of film for a presence of micro-defects.

The PPE may include gloves.

Implementations of the method may also include interconnecting a second at least two plies of film, cutting from the at least two plies of film a shape of a glove, cutting from the second at least two plies of film a shape of a glove, and joining the cut at least two plies of film to the cut second at least two plies of film at edges of the cut at least two plies of film and the cut second at least two plies of film.

Implementations of the method may include sealing a joint formed between the cut at least two plies of film and the cut second at least two plies of film.

Cutting at least two plies of film, cutting the second at least two plies of film, and sealing the joint may all occur simultaneously.

The at least two plies of film may include different materials than the second at least two plies of film.

The at least two plies of film may be textured.

The at least two plies of film may be stretched.

Implementations of method of manufacturing personal protective equipment (PPE) gloves may include stacking at least two upper plies of film, stretching the at least two upper plies of film, interconnecting the at least two upper plies of film through one of thermal embossing or ultrasonic welding, stacking at least two lower plies of film, stretching the at least two lower plies of film, interconnecting the at least two lower plies of film through one of thermal embossing or ultrasonic welding, stacking the at least two upper plies of film over the at least two lower plies of film, cutting the at least two upper plies of film and the at least two lower plies of film in the shape of a glove, and sealing the cut at least two upper plies of film and the cut at least two lower plies of film to one another.

Implementations of the method may include forming a plurality of waves in a first ply of the at least two upper plies of film and forming a plurality of waves in a second ply of the at least two upper plies of film. The plurality of waves of the first ply may be opposite the direction of the plurality of waves of the second ply when the first ply is interconnected to the second ply.

BRIEF DESCRIPTION OF THE DRAWINGS

Implementations will hereinafter be described in conjunction with the appended drawings, where like designations denote like elements, and.

DETAILED DESCRIPTION

It is possible to develop a simple and innovative technology for the production of disposable barrier gloves using stretchable multilayer ultra-thin and ultra-light films that are made of fully recyclable, or biodegradable and compostable, thermoplastics.

The method of manufacturing multi-layer film sheets intended for the manufacture of protective covers for body parts (PPE=Personal Protective Equipment), in particular gloves or packaging according to the invention, is characterized by the fact that at least two individual sheets of film stacked on top of each other are connected to each other continuously and homogenously by welding, thermal extrusion, or ultrasonic welding. Externally pressed microscopic nets or other non-continuous patterns in the co-extrusion process will attach separate sheets of foil corrugated with mesh rollers and then joined after passing through the stamping rollers to create weak and nonhomogeneous bonds that will make separate sheets of ultra-thin film attached. Films of different physical properties, as well as different functionality, can be attached in a nonhomogeneous and noncontinuous way.

Preferably before or during the bonding process, individual sheets of film are stretched alternately either longitudinally or transversely. This method allows to combine films stretched by the machine in the direction of rotation of the machine with another film stretched transversely to the rotation of the machine. These two types of ultra-thin machine-stretched film should merge together online, where the tensioned and wavy films will be glued together in the extrusion process using the chosen technique. In this configuration, the film will show flexibility and good tensile strength (TS).

Preferably before joining, individual sheets of foil are undulated alternately longitudinally and/or transversely.

Preferably, the bonded joining between individual sheets of film creates a grid pattern.

Films selected from the group including high-density polyethylene films (HDPE), low-density polyethylene films (LDPE), films based on thermoplastic polymers manufactured from monomer of ethylene, polystyrene, polyurethane, polybutene, styrene-butadiene copolymers, ethylene-propylene copolymers (EPC), styrene-ethylene-butylene-styrene (SEBS), styrene-isoprene-styrene (SIS), films with polyvinyl chloride, films enriched with thermoplastic fibers, printed films or mixtures thereof, whereby different types of foil or films of the same type are combined and attached using non-homogeneous co-extrusion methods.

Preferably, the bonding between individual plies of film has less strength than the weakest ply.

It is preferable to use single ply sheets of film with a thickness equal to or lower than 0.1 mm for bonding processes.

Preferably, each ply of the film is inspected electronically for the presence of micro holes, micro-bulges, thin spots, and other types of micro defects.

The subject of the invention also includes various shape covers for different body parts, in particular gloves, which are characterized by the fact that they are made of sheets of multi-ply film described above.

The method of manufacturing gloves from the foil sheets, described above, consists in cutting the shape of the gloves from the foil sheet and joining the cut elements at the edges, excluding the part comprising the palm retracting hole. According to the invention, at least one sheet of foil composed of at least two individual plies of film connected with nonhomogeneous bonding and non-continuous patterns is laid on at least one sheet composed of at least two individual plies of film coextruded in the same manner After two separate sheets of multi-ply film laid on each other as described above films are ready for cutting the shape of the gloves. The cut out elements are joined, and the joints are permanently glued and completely sealed. Joining is carried out by the chosen method of homogeneous extrusion. If necessary, the top and bottom sheets on the edges of the glove around the palm insertion hole are bonded separately and sealed. Because of this, the separate plies of foil around the palm insertion hole do not diverge. This method can also be used to produce packaging or various shapes covers for other parts of the body, e.g. feet, legs, arms, head caps, and aprons. For each end product, properly designed shapes are cut out of multiplies sheets and bonded accordingly.

Preferably, the cutting, sealing, and joining takes place simultaneously.

Preferably, the tear strength of joints is greater than the average tear strength of a single sheet of film. In this way, the seal (boundary connection) cannot be torn apart before the entire film from which the glove is made is damaged.

Preferably, for the manufacturing of the upper and lower parts of the glove, film sheets with different properties are used.

Preferably, the film intended for the upper part of the glove is elastic, and the film intended for the lower part of the glove is textured.

It is advantageous to apply the pre-design print on the foil sheets in advance, and in exact and specific places corresponding to the whole surface of the gloves, or a part, or only a small portion of outer or inner surfaces, before cutting of the gloves. This is to ensure that no printing will be applied at the surfaces intended for sealing and trimmings Trimmings will be recycled for further extrusion processing.

For the production of multi-ply sheets of film, coextrusion methods are used, where separate plies are bonded together by non-homogeneous and non-continuous patterns that results in lightly connecting the separate ultra-thin plies.

If films that are wavy and stretchy (in opposite directions) are used (in the production), then it will be beneficial to have the pressure of mesh hot rollers, to achieve external cross-linking with a non-continuous pattern (or micro net for more complex bonding) when overlapping two or more sheets of foil. This can be done in such a way that two or more sheets of film, in a stretched tensioned state and waved in opposite directions, will pass through the process of non-homogeneous co-extrusion to connect separate sheets of film to each other with a weak bond. These weak bonds can be made using low temperature, press lamination mesh rollers, or other methods used for discontinuous and non-homogeneous coextrusion processes, including using the ultrasonic extrusion method.

The films used in this manufacturing method must be made of thermoplastics. They should be also fully recyclable.

Multi-ply film can be created from combined multiple separate plies of ultra-thin hydrophobic films and at the same time films with high chemical resistance. The film produced using this manufacturing method will be waterproof, as well as provide protection against chemical and microbiological penetration and permeation (in accordance with EN 374 type A chemical protection).

Micro defects detection monitoring will be continuous during the manufacturing process using electronic sensors. The multi-ply film or foil produced in this way can be used for the production of medical and food processing gloves. An added advantage is that film made of different types of materials (multi-ply stretchy films for example) can be used to supply gloves for better comfort and flexibility. In the case of using stretched and non-continuously bonded multi-ply films, each ply thickness can be less than 0.1 mm or for ultra-thin film, the multiple plies with thickness of 0.02 mm-0.001 mm can be used.

Various shapes of gloves or of other coverings can be cut with hot rollers with curved and preheated metal cutters or using other types of modern extrusion and coextrusion processes including laser and/or ultrasonic. When using a laser or ultrasonic extrusion process, the change in size or shape of thermoplastic gloves will be easily adjusted using an automated and digitally controlled computer program.

Therefore the most advantageous and recommended are the methods of laser extrusion for cutting and sealing of thermoplastic films. In the manufacture of multi-ply films ultrasonic welding is recommended for non-continuous and non-homogeneous bonding of the separate film plies.

The film sheets used to make the upper (outer) and lower (inner) parts of the glove may differ in the type of film used and may have different physical properties. The film intended for the lower part of the glove (the inside of the hand) can be distinguished by the appropriate texture and may have different patterns and also different thickness for optimal grip or sensitivity in accordance with an intended functionality of ready-made gloves.

The method that is the subject of this invention allows the use of varied textures for better grip and also touch sensitivity (to operate touch screens for example). Textures can vary in both thickness and roughness. They can also cover different areas of the hand, e.g. only fingertips, or other selected areas of the hand where the texture will be applied.

The method allows the use of film produced on site immediately before the operation of bonding its separate plies into sheets, as well as finished film produced at other locations and/or from other suppliers.

Gloves made according to the invention can include "glove(s) in a glove", where one glove is placed in another, and then even an option where both are placed in a third glove, and all are joined by a very thin web or mesh or by means of a non-continuous embossed pattern in a non-homogeneous co-extrusion process.

Gloves made according to the invention can be automatically packed in a waterproof/dustproof thermoplastic film package with an opening location (hole) at the cuff area for easy removal and safe donning.

Manufactured gloves can also be inspected for the existence of micro-holes and other micro-defects using sensors connected to a computer system. Known micro defects detection systems are able to detect microscopically small defects (>8 μm) in the film or in the individual layers and coatings of the glove surface.

The most advantageous and recommended for this manufacturing method are laser extrusion methods for cutting and sealing thermoplastic films and ultrasonic welding for non-continuous non-homogeneous bonding of separate film layers.

Gloves made in this way, from ultra-thin plies of foil stretched by machine and slightly glued together with weak and non-continuous bonding, including mesh, can provide a greater tensile strength (sometimes more than 20 MPa). In order to further increase the strength of gloves, further plies of multilayer ultra-thin thermoplastic films can be added (and combined as above in coextrusion). In this way, it will be possible to achieve tensile strengths of thermoplastic gloves reaching up to 30 Mpa and above. In comparison, the tensile strength of synthetic nitrile gloves (with thickness=0.05 mm) is approximately 14 MPa, and for latex gloves (thickness=0.08 mm) the maximum is approximately 18 Mpa.

To optimally increase the flexibility of thermoplastic gloves, all of the following options can be utilized: ultra-thin flexible films based on high-density polyethylene (HDPE), low-density polyethylene films (LDPE) produced in lower temperatures and pressures by copolymerization of ethylene and various higher alpha-olefins such as butene, hexane or octane, films based on thermoplastic polymers produced from monomer ethylene, polystyrene, polyurethane, polybutene, styrene-butadiene copolymers, ethylene and propylene copolymers (EPC), styrene-ethylene-butylene-styrene (SEBS), styrene-isoprene-styrene (SIS), polyvinyl chloride and various other related mixtures.

The use of the above-mentioned films for one, two, or additional plies of film bonded together in non-homogeneous way will enable the production of gloves with a thickness in the range of 0.02 mm to 0.05 mm.

According to the invention, this new manufacturing method also makes it possible to discontinue usage of harmful phthalate plasticizers used in PVC gloves based on the current state of technology. The PVC film used in the invention may contain unconventional plasticizers, such as adipates, citrates, azelates, trimellitates, chlorinated paraffin, and also their combinations, or may not contain them at all.

Individual sheets of film can be reinforced by embossing micro-grids on them. They can also be modified by applying specialized coatings or nanolayers (by nano printing). For this purpose, there can be used various types of oils or other skin therapeutics or protective substances (e.g. rose, lavender, orange, cassava oils, etc.). Nano printing can be applied to the whole or only selected areas of the gloves. Nano printing is applied in appropriate places of multi-layer film sheets before cutting the gloves or other PPE items.

It is also possible to use multi-ply films with fibers such as Kevlar, polymer fibers, polyimides, aramids, and other thermoplastic fibers suitable for the intended use in gloves or other PPE items. These fibers can be added to the middle or outer layer of the film to increase tensile and tear strength, and to increase cut resistance, puncture resistance, and abrasion resistance.

According to the invention, the methods can use the same production lines for a very wide range of products including different sizes, different properties, and for different purposes.

Figure 1:
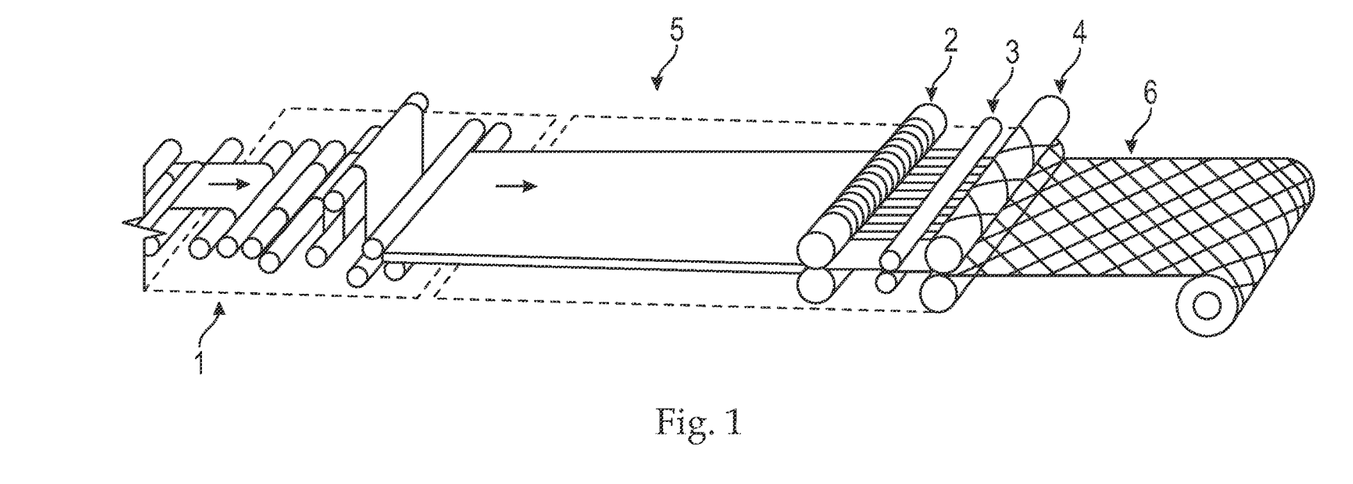
FIG. 1 illustrates the production scheme of multi-ply and multilayer film stretched along the process line.
Figure 2:
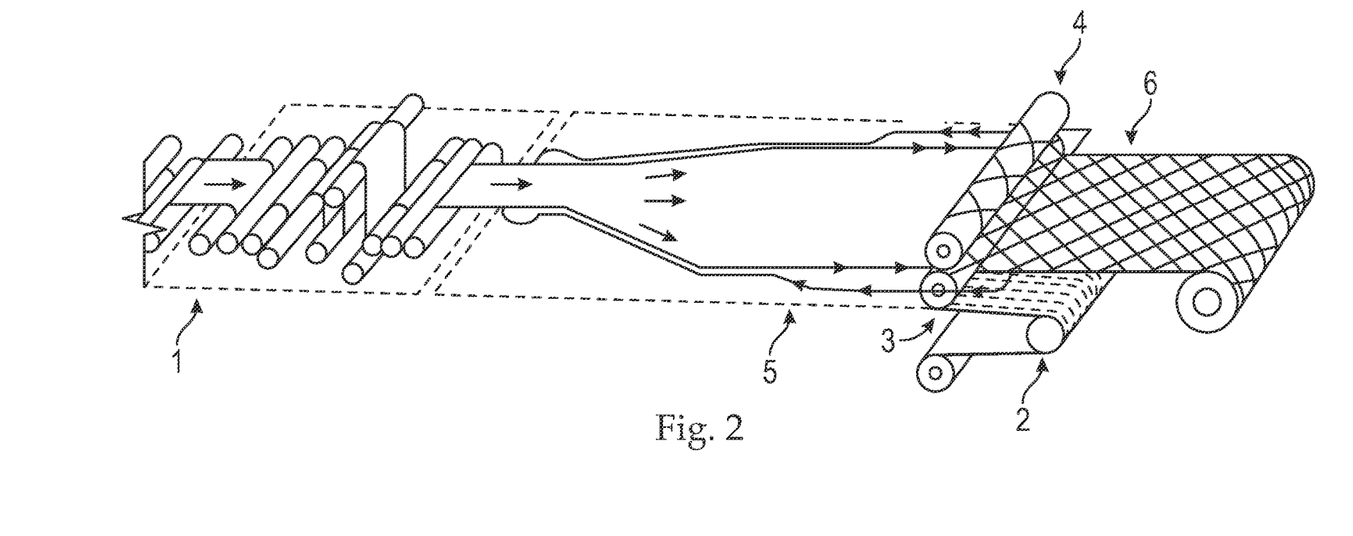
FIG. 2 illustrates a diagram of the production of multi-ply and multilayer films stretched in the transverse direction to the process line.
Figure 3:
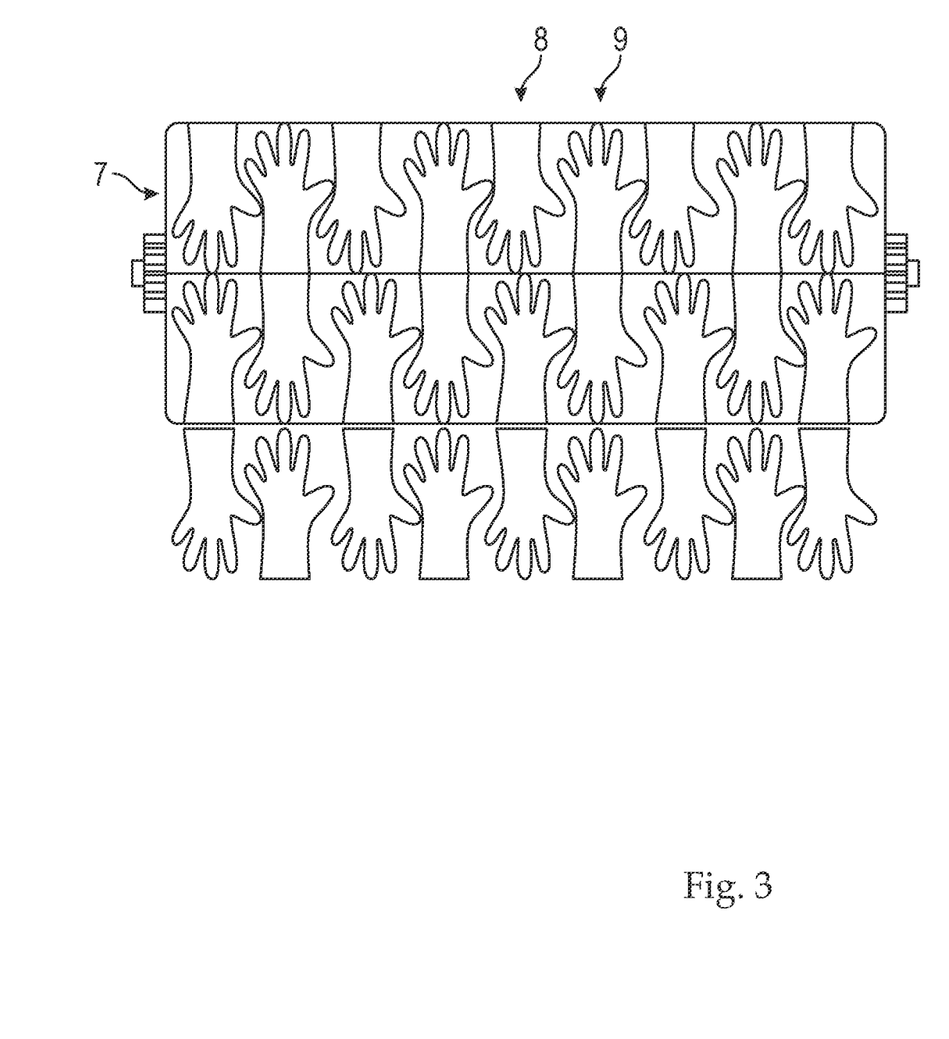
FIG. 3 illustrates a multi-section mesh roller for cutting and thermal sealing of gloves.
Figure 4:
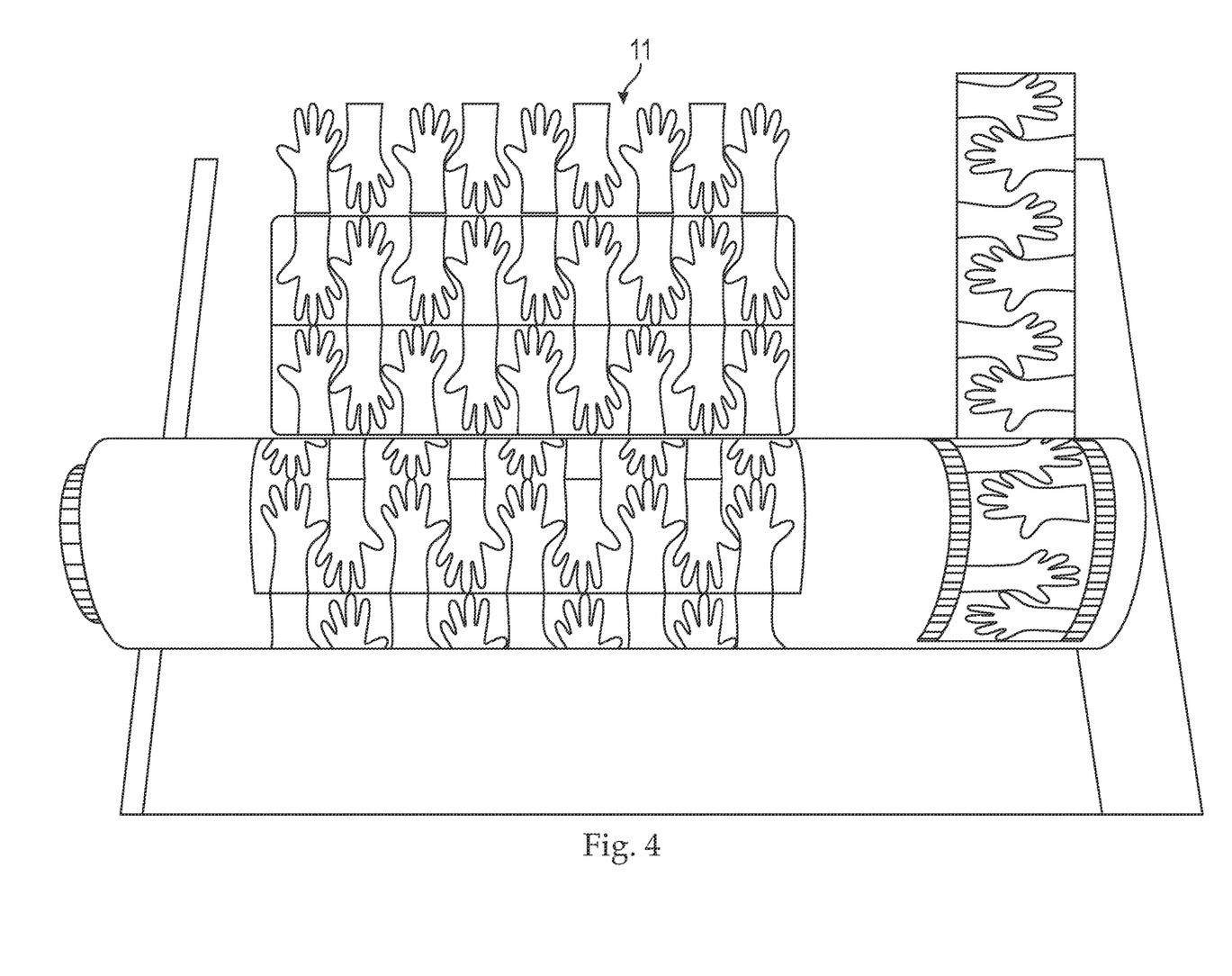
FIG. 4 illustrates a top view of the cutting and sealing process using a mesh roller with forms for fitted gloves.
Figure 5:
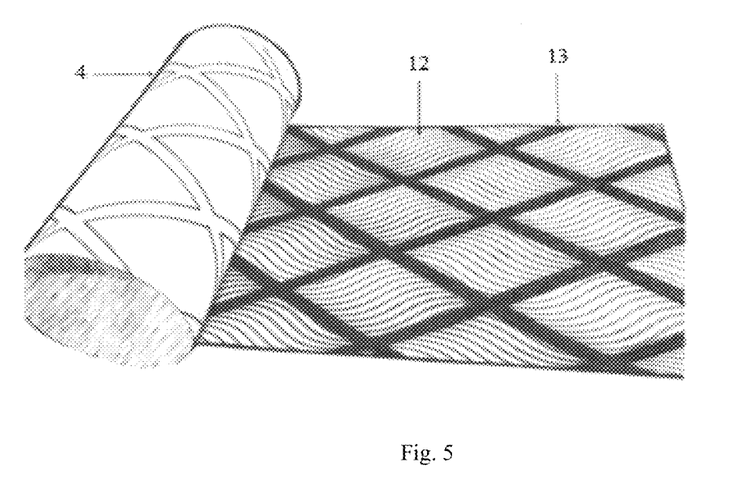
FIG. 5 illustrates the process of bonding, with a mesh roll, two plies of film.
Figure 6:
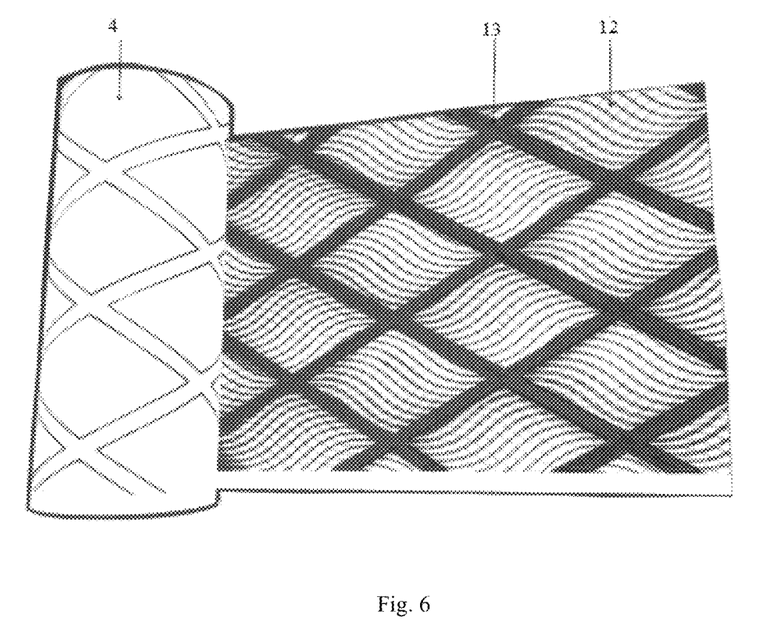
FIG. 6 illustrates the process of bonding with a mesh roller in the extrusion process by heating an pressing the roll.
Figure 7:
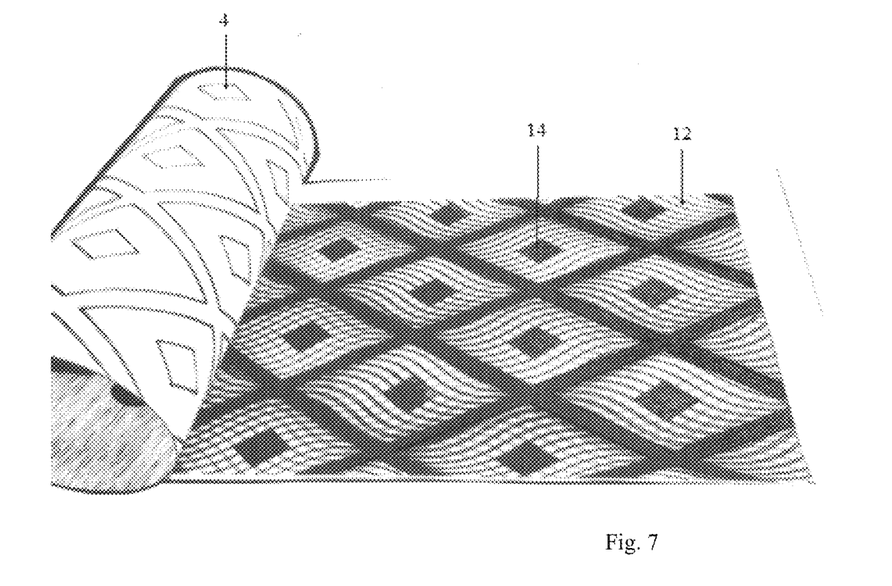
FIG. 7 illustrates the process of joining two separate plies of wavy film alternating in opposite directions.
Figure 8:
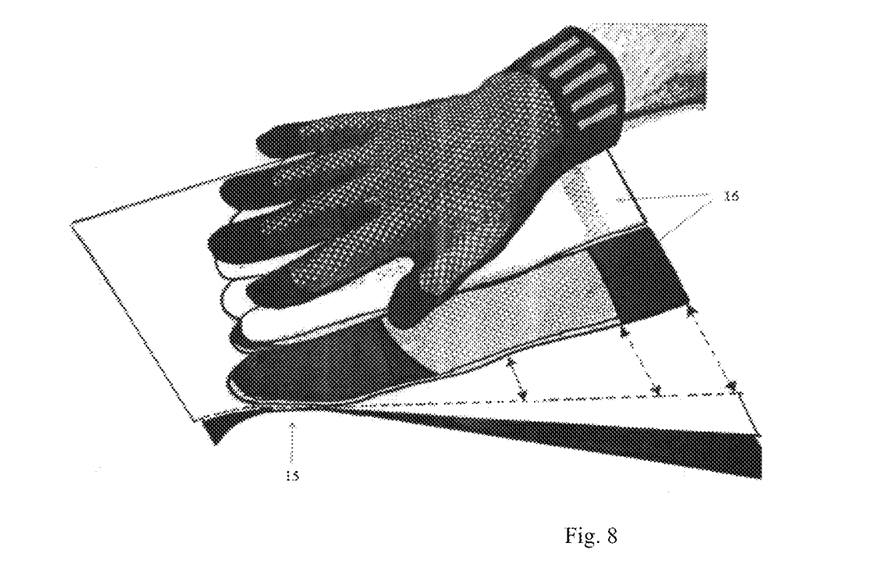
FIG. 8 illustrates the process of assembling and selecting the correct types of foil for making gloves.
Figure 9:
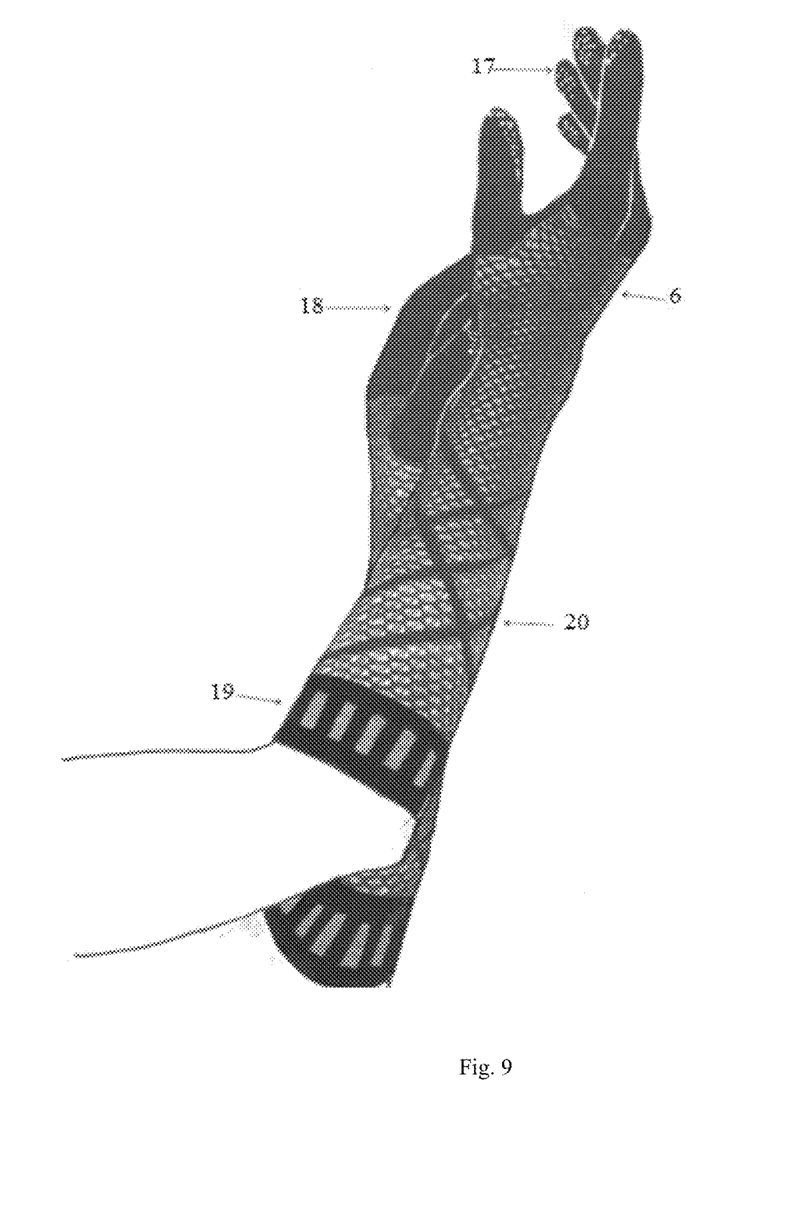
FIG. 9 illustrates an implementation of gloves.
Figure 10:
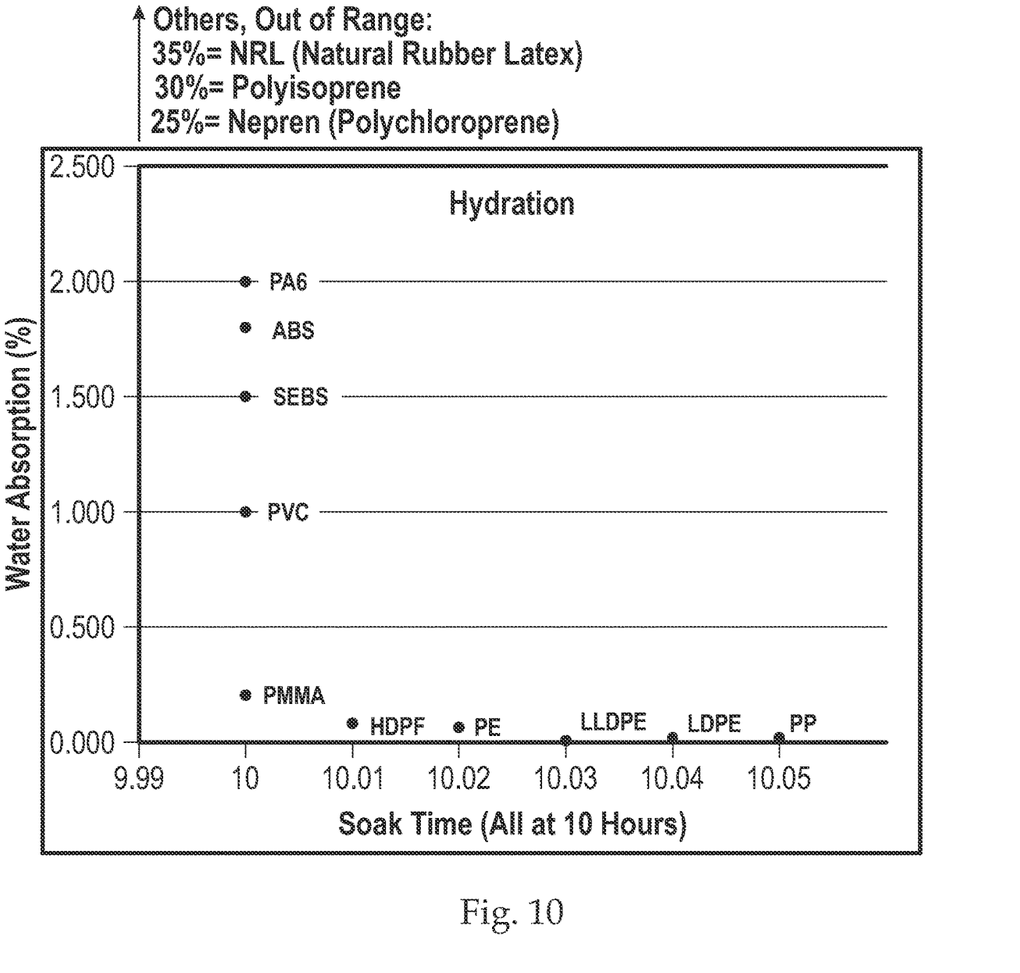
FIG. 10 illustrates a first set of test results.
Figure 11:
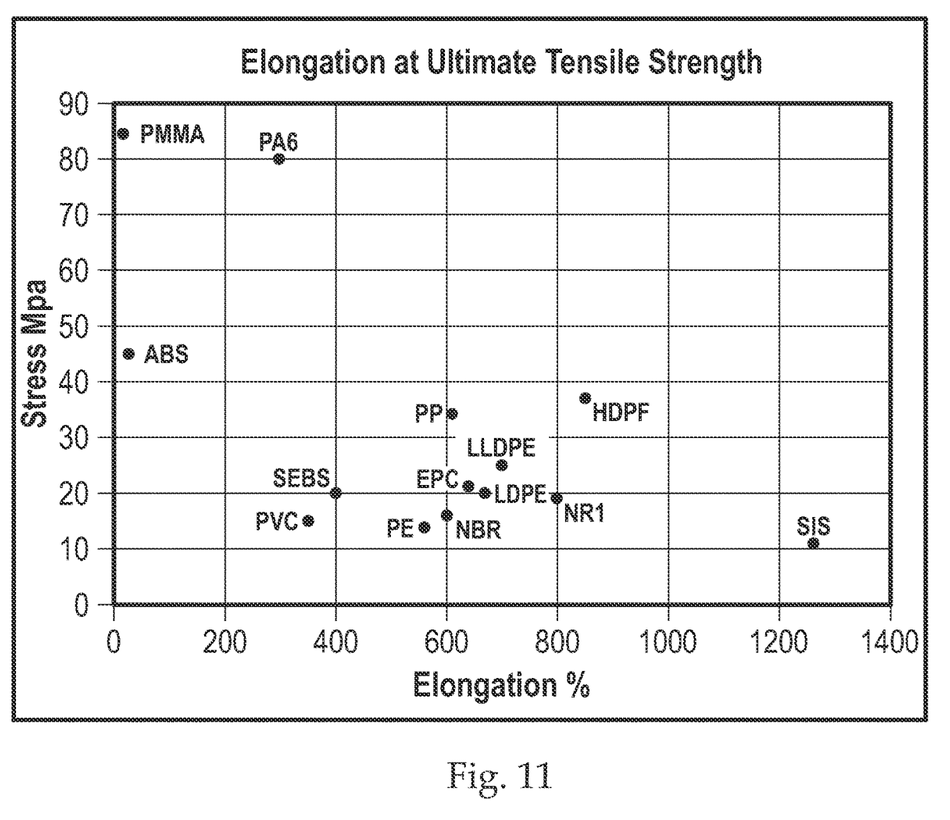
FIG. 11 illustrates a second set of test results.

The object of the invention is depicted in the example drawings, where FIG. 1 shows the production scheme of multi-ply and multilayer film stretched along the process line (MD-Machine Direction); FIG. 2 presents a diagram of the production of multi-ply and multilayer films stretched in the transverse direction to the process line (TD-Transverse Direction); FIG. 3 shows a multi-section mesh roller for cutting and thermal sealing of gloves; FIG. 4 shows a top view of the cutting and sealing process using a mesh roller with forms for fitted gloves; FIG. 5 presents the process of bonding, with a mesh roll, two plies of film, where one is smooth and the other is wavy along the machine direction (MD); FIG. 6 shows the process of bonding with a mesh roller in the extrusion process by heating and pressing the roll (with pattern) to connect two plies of film alternately tensioned and wavy in opposite directions; FIG. 7 shows the process of joining two separate plies of wavy film alternating in opposite directions (MD & TD) in the process of non-homogeneous extrusion and embossing using a mesh roller with a grooved mesh pattern (and with a complementary element in the shape of a diamond); FIG. 8 presents the process of assembling and selecting the correct types of foil for making gloves; FIG. 9 depicts ready-made gloves; FIGS. 10 and 11 present a comparative summary of the results of tests carried out for thermoplastic films and rubber films.

Example 1

The production of multi-ply sheets of machine-oriented film (MD-Machine Direction), intended for the production of protective covers (PPE personal protective equipment), in particular gloves and packaging, is carried out in such a way that single-ply films are stacked on top of each other, are stretched towards the process line (MD-Machine Direction) (1), in order to obtain ultra-thin stretchable (in one direction) foil. The film passes through the first series of (2) mesh rollers that corrugate it, and then through the guide rollers (3) pressing the wavy film, where the wave is flattened in preparation for bonding. Corrugated and flattened by the guide roller (3), the film goes under the hot mesh roller (4) with a grooved non-continuous pattern, allowing bonding (by means of temperature and pressure) of the film consisting of two or more independent plies of film stacked above each other and tensioned towards the process direction (MD). The resulting light bonding is non-homogeneous and in the form of weak bonds between separate plies of film. The process of stretching the film takes place throughout the entire area (5) and takes place in the direction of the process line (MD-machine direction). The obtained multi-ply sheet of foil (6) is ready for use in the production of gloves or other body covers (PPE) and packaging. A multi-ply film consists of at least two individual plies of film bonded together, where at least one ply of film is stretched in process direction and is wavy. Individual plies of film are slightly bonded together with weak bonds that form non-continuous and non-homogeneous patterns and/or mesh.

Example 2

Manufacture of multi-ply sheets of transverse direction (TD) film intended for the manufacturing of protective covers for body parts (PPE), in particular gloves and packaging proceeds in such a way that single-ply of multilayer foil stacked on top of each other are stretched towards the process direction (MD) (1), in order to obtain ultra-thin stretchy foil film. The film passes through the first series of mesh rollers (2) that corrugate it, and then through the guide rollers (3) pressing the wavy film, where the wave is flattened in preparation for bonding. Wavy and flattened by the guide roller (3), the film goes under the hot mesh roller (4) with a grooved non-continuous pattern allowing by means of temperature and pressure to lightly bond the film consisting of two or more independent plies of film stacked above each other and tensioned towards the process direction (MD). The resulting bonding (of two separate plies of foil) is non-homogeneous and forms weak bonds between the separate plies of film. The process of stretching the film takes place throughout area (5) and takes place in the transverse direction. The obtained multi-ply and multi-layer sheet of stretchable foil (6) is ready for use in the production of gloves or other body covers (PPE) and packaging. A multi-ply and multi-layer foil consists of at least two individual sheets of film bonded together, where at least one ply of film is corrugated and stretched in the transverse direction. Individual sheets of film are slightly bonded together with weak bonds that form non-continuous patterns and/or mesh.

Examples 3 and 4

Gloves made of multi-ply and multi-layer film sheets are manufactured in such a way that sheets of film are fed to the section mesh multi-section roller (7) for cutting and thermal sealing/bonding of the gloves. Glove molds (8), (9) on the roll can be made of metal with a blade for cutting and sealing/bonding the edges of the fingers and hands of the gloves under the influence of pressure and temperature. The glove forms can be positioned in such a way that they connect with cuffs in order to cut two cuffs simultaneously on both sides and at the same time. It is also possible to use a small (10) cylinder with single sections for thermal cutting and sealing/bonding fitted gloves (specific to the right and left hand). The roller cuts out the glove shape from a sheet of foil (11).

Example 5

Mesh roll (4) for non-homogeneous, non-continuous bonding of the film using coextrusion to bond together corrugated plies of film (12) in the process direction pressing the mesh into the foil plies (13).

Example 6

Mesh roller (4) combines in the extrusion process, by heating and pressing the mesh pattern (13), two plies of foil (12) alternately tensioned and wavy in opposite directions, where the first ply is wavy towards the process direction (MD) and the second in the transverse direction (TD).

Example 7

Mesh roller (4) combines in the process of non-homogenous coextrusion two plies of film (12) alternately tensioned and wavy in opposite directions, where the first ply is wavy towards the process direction (MD) and the other in the transverse direction (TD). Plies (12) are connected by an embossed mesh pattern with a diamond element in the middle (14).

Example 8

The drawing illustrates the process of assembling and selecting the right types of film for making gloves.

Example 9

The foil for making the bottom of the glove (15) has the adequate texture for optimal grip. The film designed for the upper part of the glove (16) and the cuff has optimal extensibility and flexibility to help maintain agility and ergonomics of the hand, in particular at the bends/joints of fingers. The glove can also have a long cuff, even reaching behind the elbow. The fingertips (17) have a delicate texture and are adapted to work with touch screens and for precise work. Multi-ply foil in the finger zone (18) is bonded together non-homogeneously (with weak bonding) but continuously creating an optimal touch surface for the fingers and an optimal configuration for hand agility. The (6) film sheet from which the glove is made is made of a quadruple layer of ultra-thin film alternately stretched and corrugated alternately in opposite directions (MD & TD) where in the zone of the surface of the back hand (the upper surface of the glove) separate (4) plies of film are cross-linked. Cuff (19) is tied with an additional thick ribbon forming a non-continuous pattern and connecting all layers of foil in a non-homogenous manner. The elongated cuff (20) is fitted to the hand and is flexible due to an externally pressed mesh in the coextrusion process. In addition, in order to strengthen the film of the long cuff, thicker ribbons were pressed crossing each other and connecting all four layers of the film in a non-homogenous way and with a non-continuous pattern. In this way, a long cuff with high elasticity, stretchability, and a high tear resistance (index) can be produced.

The glove can be made of at least ten plies of ultra-thin film, where one film is wavy and alternately combined with a flat film. In the zone of the surface of the back hand (the upper surface of the glove), separate plies of film are cross-linked with a pattern obtained in the process of non-homogeneous coextrusion. The pattern is in the shape of stripes running in the opposite directions to the corrugated film. Gloves may contain induced/embedded fibers resistant to stretching, cutting or abrasion. The coating of the gloves can contain strong and durable aramid type fibers (such as Kevlar), or fibers from the polyamide family, such as PA6 or others highly resistant to stretch and breaking in relation to weight. The texture of the film in the bending zone of the finger joint (18) has a refracting discontinuous pattern to make this part of the glove more elastic. The cuff (19) is made tight with an additional reinforced thick web, forming a continuous but non-uniform pattern, and connecting all layers of film as well as connecting the induced fibers in a non-homogeneous way.

Test Results

Drawing of FIG. 10 presents a graph that provides a comparative summary of the results of tests carried out for thermoplastic films, used in this invention and rubber films used in accordance with current glove manufacturing techniques, for their resistance to water absorption (hydration). HDPE (High Density Polyethylene), PE (Polyethylene), LDPE (Low Density Polyethylene) and LLDPE (Linear Low Density Polyethylene) films are practically hydrophobic and maintain a near-zero rating for the hydration of these materials over a time interval of up to 10 hours of exposure to water. In comparison, current standard rubber gloves have less desirable (negative) results, because their hydration is in the range of 25% to 35% for the same time interval up to 10 hours. In general, the rubber gloves have a spongier (porous) structure and generally exhibit a higher water permeability and a higher water absorption coefficient. In the case of rubber gloves made of NRL (Natural Rubber Latex) they have a hydration rate of about 35%.

| | Comparison of hydration water absorption Percent swelling of materials during immersion in water for about 10 hrs Thermoplastic and Rubber Films | | |
|---|---|---|---|
| No | Material | Time/hours | Water absorption/percent % |
| 1 | PVC | 10 | 1.000 |
| 2 | SEBS | 10 | 1.500 |
| 3 | PE | 10.02 | 0.060 |
| 4 | PP | 10.05 | 0.020 |
| 5 | LDPE | 10.04 | 0.010 |
| 6 | LLDPE | 10.03 | 0.005 |
| 7 | HDPE | 10.01 | 0.080 |
| 8 | ABS | 10 | 1.800 |
| 9 | PMMA | 10 | 0.200 |
| 10 | PA6 | 10 | 2.000 |
| | Rubber | | |
| 11 | NRL | 10 | 35.000 |
| 12 | Chloroprene/Neopre | 10 | 25.000 |
| 13 | Polyisoprene | 10 | 30.000 |

Drawing of FIG. 11 presents a graphic comparative summary of the results of tensile strength tests carried out for thermoplastic films used in the invention compared to rubbers used for current glove markets. The table presents the results of tensile strength tests performed for thermoplastic and rubber materials as follows:

Tensile strength

| No | Material | Elongation % | Highest tensile strength Mpa |
|---|---|---|---|
| 1 | PVC—Polyvinyl chloride | 350 | 15 |
| 2 | SEBS—Sterino Ethylene Butadiene Sterin | 400 | 20 |
| 3 | PE—Polyethylene | 560 | 14 |
| 4 | NBR—Nitrile Rubber | 600 | 16 |
| 5 | PP—Polypropylene | 610 | 34 |
| 6 | EPC—EthylenePropylene copolymer | 640 | 21 |
| 7 | LDPE—Low density polyethylene | 670 | 20 |
| 8 | LLDPE—Linear Low Density Polyethylene | 700 | 25 |
| 9 | NRL—Latex Rubber | 800 | 19 |
| 10 | HDPE—High Density Polyethylene | 850 | 37 |
| 11 | ABS—Acrylonitrile Butadlene Styrene | 30 | 45 |
| 12 | PMMA—Poly Methyl Metha Acrylic | 20 | 84 |
| 13 | PA6—Polyamide 6 (Nylon) | 300 | 80 |
| 14 | SIS—Steryn Izopren Sterin | 1260 | 11 |
| 15 | Kevlar—polymer from the group of polyamides (aramids) | 340 | 3757 |

Kevlar goes beyond the group of the above-mentioned and presented on the graph rubber materials and thermoplastic films. It is a polymer from the group of polyamides (more precisely aramids), from which artificial fibers with high tensile strength are spun. For comparison, its tensile strength is 3757 Mpa. Kevlar, like other materials with high resistance from the group of polymers (especially aramids), can be used to combine with thermoplastics in the form of (for example) a mesh or induced clippings on selected zones on glove surfaces (e.g. on Finger tips, fingers, and/or the palm of the hand) to significantly increase the resistance of gloves to tearing, cuts, punctures, or abrasion.

The invention claimed is:

1. A method of manufacturing personal protective equipment (PPE) comprising:
   stretching a first ply of film in a first direction;
   stretching a second ply of film in a second direction perpendicular to the first direction;
   corrugating the first ply of film;
   corrugating the second ply of film;
   stacking the first ply of film and the second ply of film after corrugating the first ply of film and the second ply of film, wherein the first ply of film and the second ply of film are stacked in stretched orientations and wherein a stretched orientation of the second ply of film is perpendicular to a stretched orientation of the first ply of film; and
   interconnecting the first ply of film and the second ply of film through weak bonding through one of thermal embossing or ultrasonic welding;
   wherein the first ply of film is non-continuously bonded to the second ply of film.

2. The method of claim 1, wherein the first ply of film is corrugated in a first direction and the second ply of film is corrugated in a second direction perpendicular to the first direction.

3. The method of claim 1, wherein the first ply of film and the second ply of film are passed through a hot mesh roller with a grooved non-continuous pattern that forms a mesh pattern in the first ply of film and the second ply of film.

4. The method of claim 1, wherein the first ply of film and the second ply of film comprise one of high-density polyethylene (HDPE), low-density polyethylene (LDPE), film based on thermoplastic polymers made of ethylene monomer, polystyrene, polyurethane, polybutene, styrene-butadiene copolymers, ethylene-propylene copolymers (EPC), styrene-ethylene-butylene-styrene (SEBS), styrene-isoprene-styrene (SIS), polyvinyl chloride films, or films enriched with thermoplastic fibers.

5. The method of claim 1, wherein a bond between the first ply of film and the second ply of film after interconnection is weaker than the first ply of film and the second ply of film.

6. The method of claim 1, wherein each ply of film comprises a thickness equal to or less than 0.1 mm.

7. The method of claim 1, further comprising inspecting each ply of film for a presence of micro-defects.

8. The method of claim 1, wherein the PPE comprises gloves.

9. The method of claim 1, further comprising:
   interconnecting a third ply of film and a fourth ply of film;
   cutting from the first ply of film and the second ply of film a shape of a glove;
   cutting from the third ply of film and the fourth ply of film a shape of a glove; and
   joining the first ply of film and second ply of film to the third ply of film and fourth ply of film at edges of the first ply of film and second ply of film and the edges of the third ply of film and fourth ply of film.

10. The method of claim 9, further comprising sealing a joint formed between the first ply of film and second ply of film and the third ply of film and fourth ply of film.

11. The method of claim 10, wherein cutting the first ply of film and the second ply of film, cutting the third ply of film and the fourth ply of film, and sealing the joint all occurs simultaneously.

12. The method of claim 9, wherein the first ply of film and the second ply of film comprise different materials than the third ply of film and the fourth ply of film.

13. The method of claim 9, wherein the first ply of film and the second ply of film are textured and the third ply of film and the fourth ply of film are textured.

14. The method of claim 9, wherein the first ply of film and the second ply of film are stretched and the third ply of film and the fourth ply of film are stretched.

15. The method of claim 1, wherein an entirety of the first ply of film within the PPE is corrugated and an entirety of the second ply of film within the PPE is corrugated.

16. The method of claim 15, wherein the first ply comprises a plurality of ridges parallel to one another across the entire length of the PPE and the second ply comprises a plurality of ridges parallel to one another across the entire length of the PPE.

17. A method of manufacturing personal protective equipment (PPE) gloves comprising:
   providing at least two upper plies of film;
   stretching a first ply of film of the at least two upper plies of film in a first direction and stretching a second ply of film of the at least two upper plies of film in a second direction perpendicular to the first direction;
   stacking the first ply of film of the at least two upper plies of film and the second ply of film of the at least two upper plies of film after corrugating the first ply of film of the at least two upper plies of film and the second ply of film of the at least two upper plies of film, wherein the first ply of film of the at least two upper plies of film and the second ply of film of the at least two upper plies of film are stacked in stretched orientations and wherein a stretched orientation of the second ply of film of the at least two upper plies of film is perpendicular to a stretched orientation of the first ply of film of the at least two upper plies of film;

interconnecting the at least two upper plies of film through one of thermal embossing or ultrasonic welding, wherein the at least two upper plies of film are passed through a hot mesh roller with a grooved non-continuous pattern that forms a mesh pattern on the at least two upper plies of film when interconnected;

stacking at least two lower plies of film;

stretching a third ply of film of the at least two lower plies of film in the first direction and stretching a fourth ply of film of the at least two lower plies of film in the second direction perpendicular to the first direction;

interconnecting the at least two lower plies of film through one of thermal embossing or ultrasonic welding, wherein the at least two lower plies of film are passed through the hot mesh roller with a grooved non-continuous pattern that forms a mesh pattern on the at least two lower plies of film when interconnected;

stacking the at least two upper plies of film over the at least two lower plies of film;

cutting the at least two upper plies of film and the at least two lower plies of film in the shape of a glove; and sealing the cut at least two upper plies of film and the cut at least two lower plies of film to one another.

18. The method of claim 17, further comprising forming a plurality of waves in the first ply of film of the at least two upper plies of film and forming a plurality of waves in the second ply of film of the at least two upper plies of film, wherein the plurality of waves of the first ply of film is opposite the direction of the plurality of waves of the second ply of film when the first ply of film is interconnected to the second ply of film.

19. The method of claim 17, wherein the first ply of film of the at least two upper plies of film is corrugated in a first direction and the second ply of film of the at least two upper plies of film is corrugated in a second direction perpendicular to the first direction.

20. The method of claim 17, wherein the third ply of film of the at least two lower plies of film is corrugated in a first direction and the fourth ply of film of the at least two lower plies of film is corrugated in a second direction perpendicular to the first direction.

* * * * *